(12) United States Patent
Burres et al.

(10) Patent No.: US 10,747,457 B2
(45) Date of Patent: Aug. 18, 2020

(54) TECHNOLOGIES FOR PROCESSING NETWORK PACKETS IN AGENT-MESH ARCHITECTURES

(71) Applicant: Intel Corporation, Santa Clara, CA (US)

(72) Inventors: Brad Burres, Waltham, MA (US); Ronen Chayat, Hafia (IL); Alain Gravel, Thousand Oaks, CA (US); Robert Hathaway, Sunnyvale, CA (US); Amit Y. Kumar, Marlborough, MA (US); Jose Niell, Franklin, MA (US); Nadav Turbovich, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 208 days.

(21) Appl. No.: 15/720,390

(22) Filed: Sep. 29, 2017

(65) Prior Publication Data

US 2018/0152383 A1    May 31, 2018

Related U.S. Application Data

(60) Provisional application No. 62/427,268, filed on Nov. 29, 2016.

(30) Foreign Application Priority Data

Aug. 30, 2017   (IN) .............................. 201741030632

(51) Int. Cl.
*H04L 12/24* (2006.01)
*H04L 12/26* (2006.01)
(Continued)

(52) U.S. Cl.
CPC .......... *G06F 3/0641* (2013.01); *G06F 3/0604* (2013.01); *G06F 3/065* (2013.01);
(Continued)

(58) Field of Classification Search
CPC ...... G06F 3/064; G06F 3/0604; G06F 3/0608; G06F 3/0611; G06F 3/0617;
(Continued)

(56) References Cited

U.S. PATENT DOCUMENTS 9,391,921 B1\*   7/2016   Riddle .................... H04L 47/78
2012/0230202 A1\*   9/2012   Reed .................. H04L 63/0209
                                                                                    370/241
(Continued)

OTHER PUBLICATIONS

Simon et al., The EAP-TLS Authentication Protocol, RFC 5216, Mar. 2008. (Year: 2008).\*
(Continued)

*Primary Examiner* — Afsar M Qureshi
(74) *Attorney, Agent, or Firm* — Barnes & Thornburg LLP

(57) ABSTRACT

Technologies for processing network packets in an agent-mesh architecture include a network interface controller (NIC) of a computing device configured to write, by a network fabric interface of a memory fabric of the NIC, a received network packet to the memory fabric in a distributed fashion. The network fabric interface is configured to send an event message indicating the received network packet to a packet processor communicatively coupled to the memory fabric. The packet processor is configured to read, in response to having received the generated event message, at least a portion of the received network packet from the memory fabric, identify an agent of the NIC for additional processing of the received network packet, generate a network packet received event message indicating the received network packet is available for processing, and transmit the (Continued)

network packet received event message to the identified agent. Other embodiments are described herein.

25 Claims, 16 Drawing Sheets

(51) Int. Cl.
*H04L 12/813* (2013.01)
*H04L 12/851* (2013.01)
*G06F 3/06* (2006.01)
*G06F 16/174* (2019.01)
*G06F 21/57* (2013.01)
*G06F 21/73* (2013.01)
*G06F 8/65* (2018.01)
*H04L 29/08* (2006.01)
*G06F 11/30* (2006.01)
*G06F 9/50* (2006.01)
*H03M 7/30* (2006.01)
*H03M 7/40* (2006.01)
*G06F 11/07* (2006.01)
*G06F 11/34* (2006.01)
*G06F 7/06* (2006.01)
*G06T 9/00* (2006.01)
*H03M 7/42* (2006.01)
*H04L 12/28* (2006.01)
*H04L 12/46* (2006.01)
*H04L 29/12* (2006.01)
*G06F 13/16* (2006.01)
*G06F 21/62* (2013.01)
*G06F 21/76* (2013.01)
*H03K 19/173* (2006.01)
*H04L 9/08* (2006.01)
*H04L 12/933* (2013.01)
*G06F 9/38* (2018.01)
*G06F 9/48* (2006.01)
*G06F 12/02* (2006.01)
*G06F 12/06* (2006.01)
*G06T 1/20* (2006.01)
*G06T 1/60* (2006.01)
*G06F 9/54* (2006.01)
*G06F 8/656* (2018.01)
*G06F 8/658* (2018.01)
*G06F 8/654* (2018.01)
*G06F 9/4401* (2018.01)
*H01R 13/453* (2006.01)
*H01R 13/631* (2006.01)
*H05K 7/14* (2006.01)
*H04L 12/911* (2013.01)
*G06F 11/14* (2006.01)
*H04L 29/06* (2006.01)
*G06F 15/80* (2006.01)

(52) U.S. Cl.
CPC ............ *G06F 3/067* (2013.01); *G06F 3/0608* (2013.01); *G06F 3/0611* (2013.01); *G06F 3/0613* (2013.01); *G06F 3/0617* (2013.01); *G06F 3/0647* (2013.01); *G06F 3/0653* (2013.01); *G06F 7/06* (2013.01); *G06F 8/65* (2013.01); *G06F 8/654* (2018.02); *G06F 8/656* (2018.02); *G06F 8/658* (2018.02); *G06F 9/3851* (2013.01); *G06F 9/3891* (2013.01); *G06F 9/4401* (2013.01); *G06F 9/4881* (2013.01); *G06F 9/505* (2013.01); *G06F 9/5005* (2013.01); *G06F 9/5038* (2013.01); *G06F 9/544* (2013.01); *G06F 11/079* (2013.01); *G06F 11/0709* (2013.01); *G06F 11/0751* (2013.01); *G06F 11/3006* (2013.01); *G06F 11/3034* (2013.01); *G06F 11/3055* (2013.01); *G06F 11/3079* (2013.01); *G06F 11/3409* (2013.01); *G06F 12/0284* (2013.01); *G06F 12/0692* (2013.01); *G06F 13/1652* (2013.01); *G06F 16/1744* (2019.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 41/0816* (2013.01); *H04L 41/0853* (2013.01); *H04L 41/12* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/2007* (2013.01); *H04L 67/10* (2013.01); *H04L 67/1014* (2013.01); *H04L 67/327* (2013.01); *H04L 67/36* (2013.01); *H05K 7/1452* (2013.01); *H05K 7/1487* (2013.01); *G06F 11/1453* (2013.01); *G06F 12/023* (2013.01); *G06F 15/80* (2013.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 47/78* (2013.01); *H04L 63/1425* (2013.01)

(58) Field of Classification Search
CPC ...... G06F 3/0613; G06F 3/0647; G06F 3/065; G06F 3/0653; G06F 3/067; G06F 8/656; G06F 8/658; G06F 8/654; G06F 16/1744; G06F 7/06; G06F 8/65; G06F 9/4401; G06F 9/4881; G06F 9/5005; G06F 9/5038; G06F 9/505; G06F 9/544; G06F 11/0709; G06F 11/0751; G06F 11/079; G06F 11/3006; G06F 11/3034; G06F 11/3055; G06F 11/3079; G06F 11/3409; G06F 12/0284; G06F 12/0692; G06F 13/1652; G06F 21/57; G06F 21/76; G06F 21/6218; G06F 21/73; H04L 9/6092; H04L 12/2881; H04L 12/4633; H04L 41/044; H04L 41/0816; H04L 41/0853; H04L 41/12; H04L 41/046; H04L 41/0896; H04L 41/142; H04L 41/178; H04L 43/04; H04L 43/06; H04L 43/08; H04L 43/0894; H04L 47/20; H04L 47/2441; H04L 49/104; H04L 61/2007; H04L 67/10; H04L 67/327; H04L 67/36; H04L 63/1425; H05K 7/1452; H05K 7/1487; H01R 13/631; H01R 13/4538; H03K 19/1731; H03M 7/3084; H03M 7/40; H03M 7/42; H03M 7/60; H03M 7/6011; H03M 7/6017; H03M 7/6029
USPC ...................................................... 370/235
See application file for complete search history.

(56) References Cited

U.S. PATENT DOCUMENTS

| | | | |
|---|---|---|---|
| 2015/0081726 A1* | 3/2015 | Izenberg | G06F 17/30563 |
| | | | 707/755 |
| 2015/0110114 A1 | 4/2015 | Wohlgemuth | |
| 2016/0062781 A1* | 3/2016 | Tsirkin | G06F 9/4843 |
| | | | 718/1 |
| 2016/0306667 A1 | 10/2016 | Burger | |
| 2017/0192921 A1* | 7/2017 | Wang | G06F 9/3004 |

OTHER PUBLICATIONS

Designing and Implementing Scalable Applications with Memcached and MySQL, A MySQL White Paper, Jun. 2008. (Year: 2008).*
Extended European search report for European patent application dated Jan. 16, 2019 (5 pages).

* cited by examiner

TECHNOLOGIES FOR PROCESSING NETWORK PACKETS IN AGENT-MESH ARCHITECTURES

CROSS-REFERENCE TO RELATED APPLICATIONS

The present application claims the benefit of U.S. Provisional Patent Application No. 62/427,268, filed Nov. 29, 2016 and Indian Provisional Patent Application No. 201741030632, filed Aug. 30, 2017.

BACKGROUND

In present packet-switched network architectures, data is transmitted in the form of network packets between computing devices and/or device components at a rapid pace. At a high level, data is packetized into a network packet, which is transmitted by a network interface controller (NIC) of one network computing device and received by a NIC of another network computing device. Upon receipt, the network packet is typically processed, classified, etc., and the payload is typically written to memory (e.g., cache, main memory, etc.). Upon having written the network packet data to memory, the receiving NIC may then notify a host central processing unit (CPU) that the data is available for further processing. However, writing the contents of the network packet data from the NIC to memory for processing by a host CPU can be expensive and introduce latency, or otherwise have some other negative performance impact.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
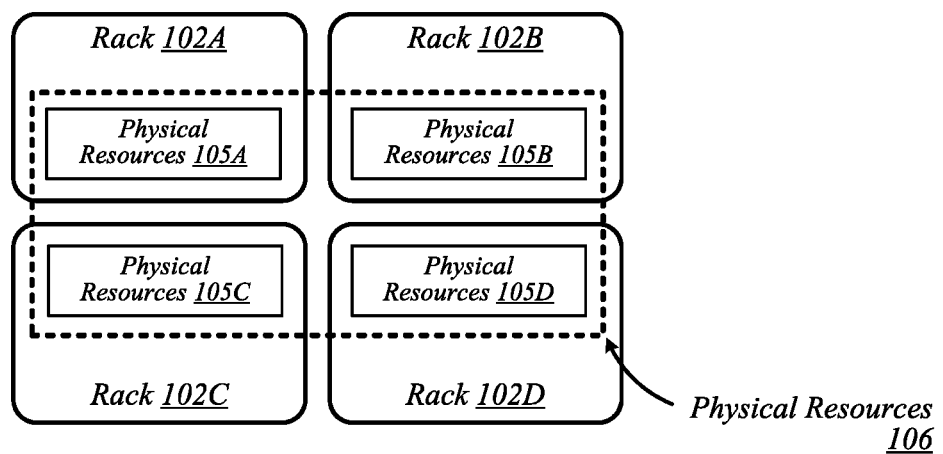
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
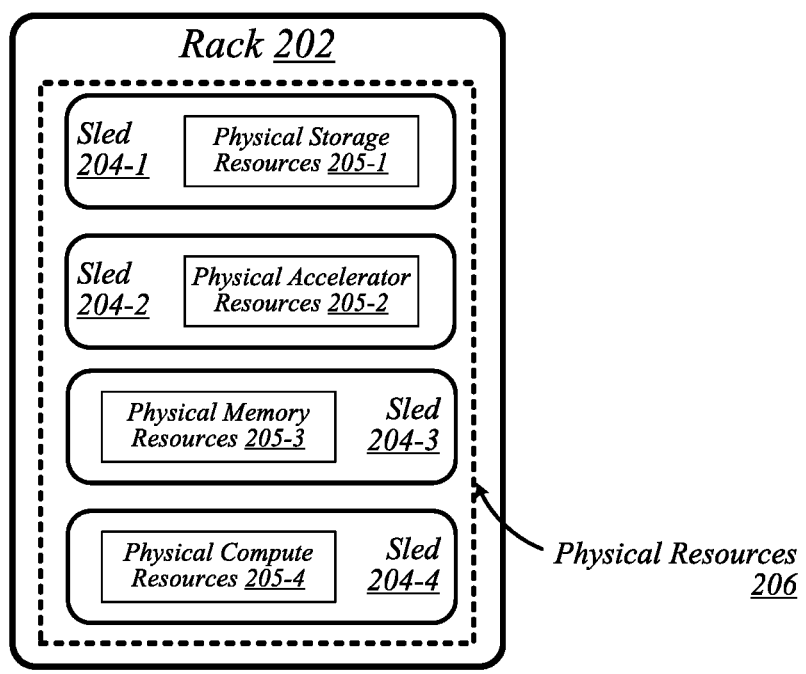
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
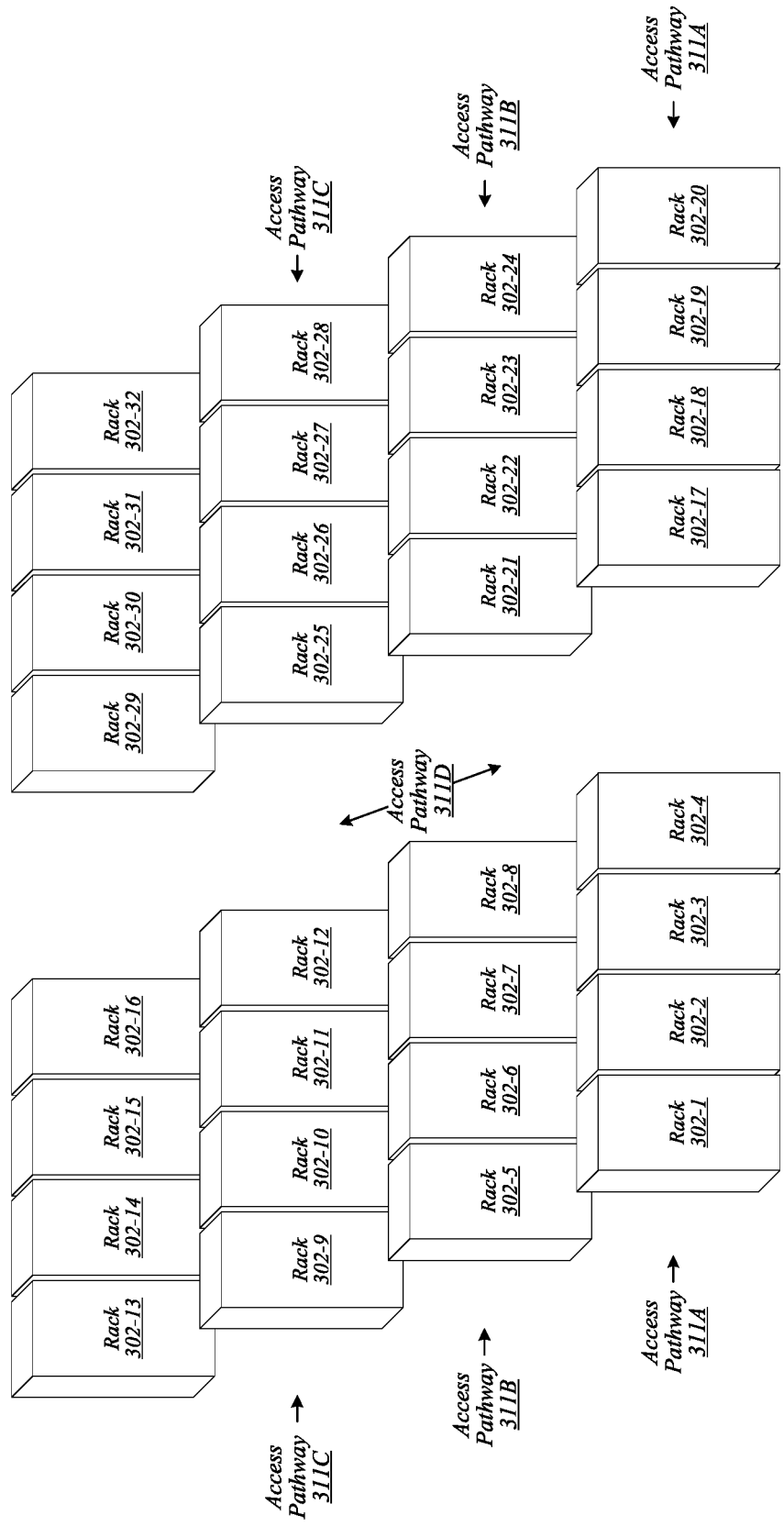
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
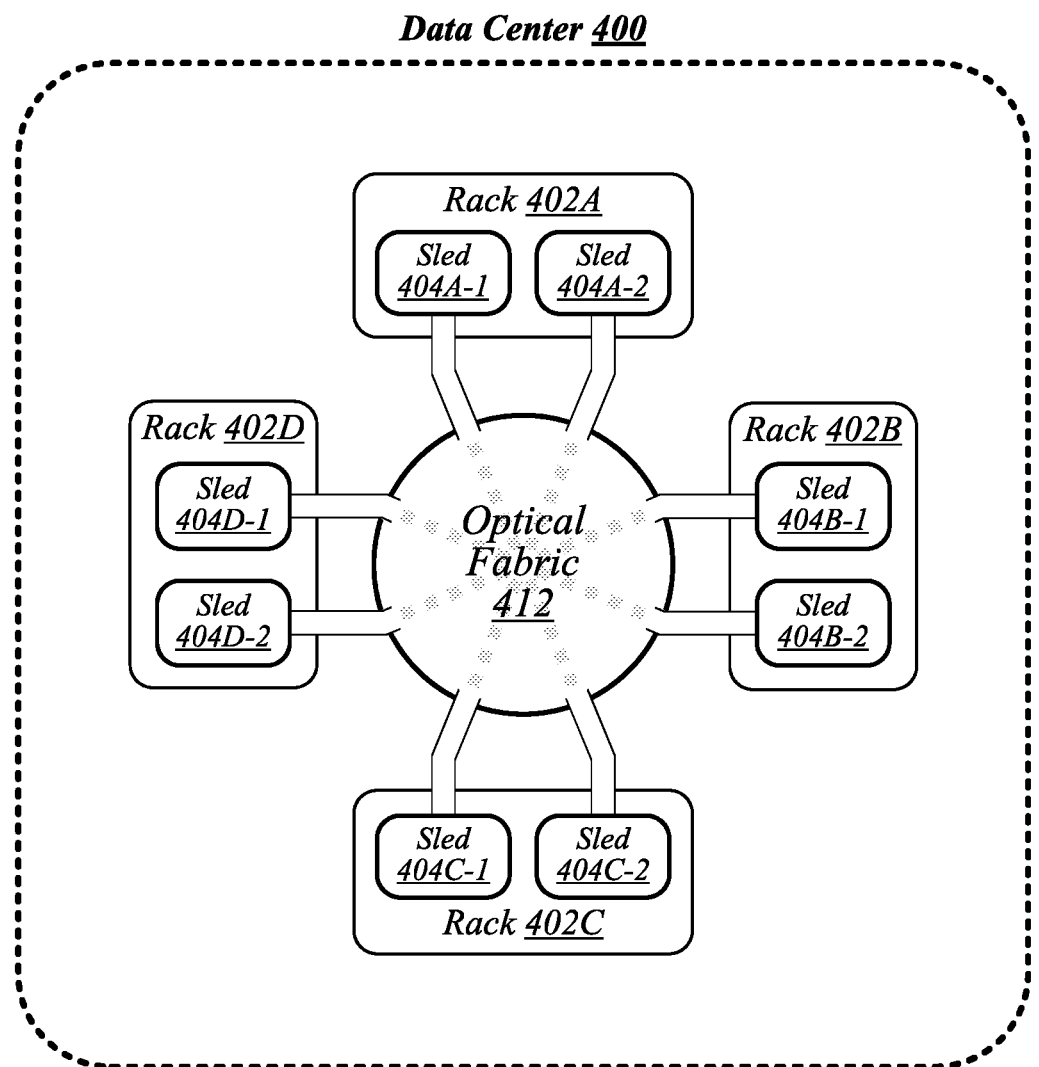
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
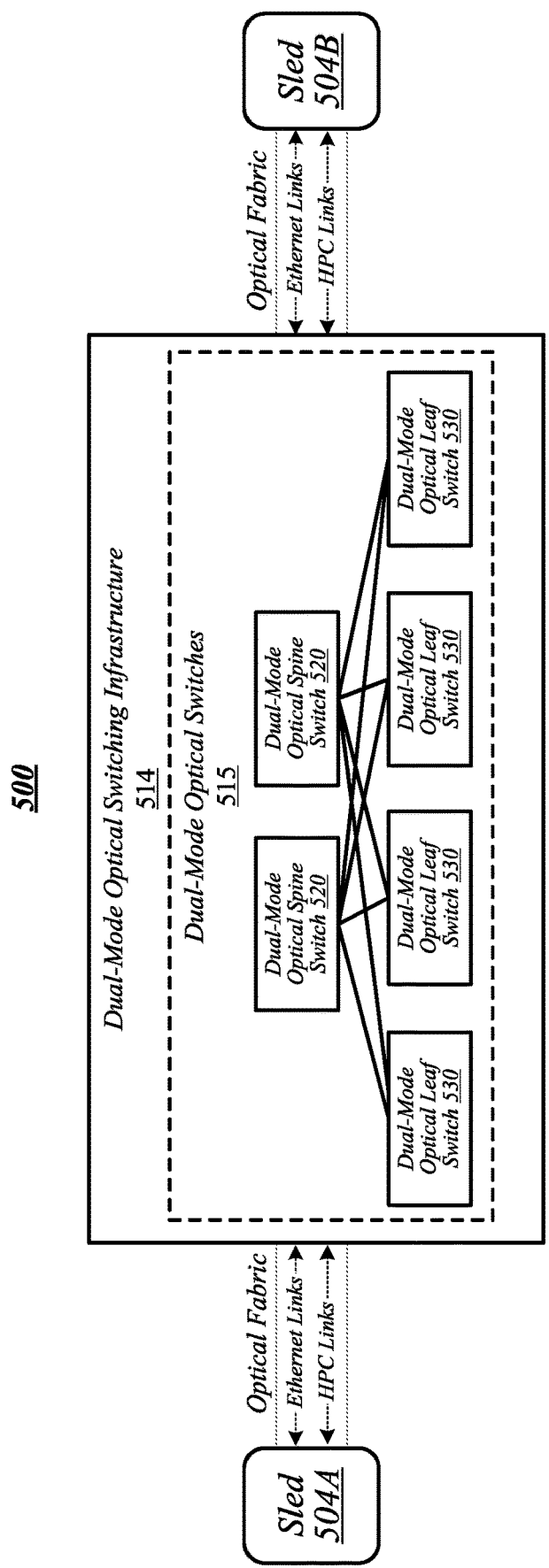
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
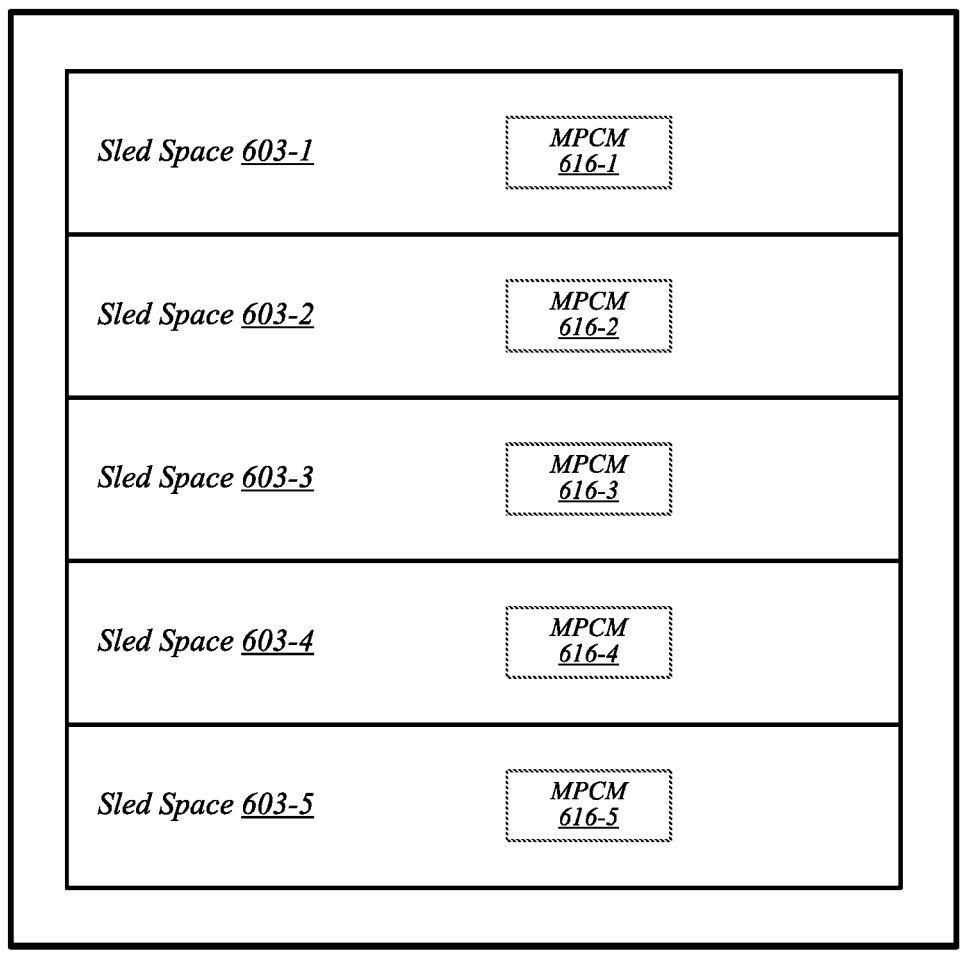
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
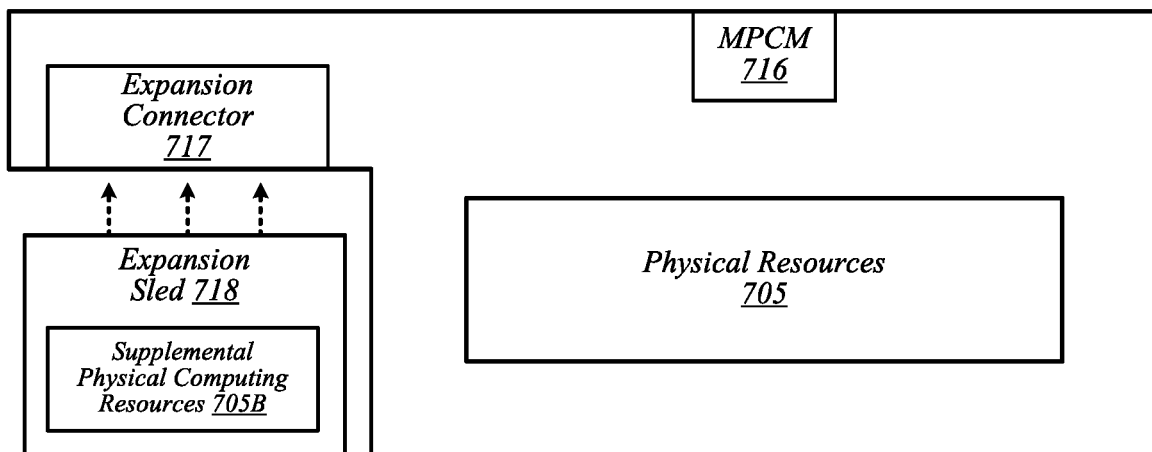
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
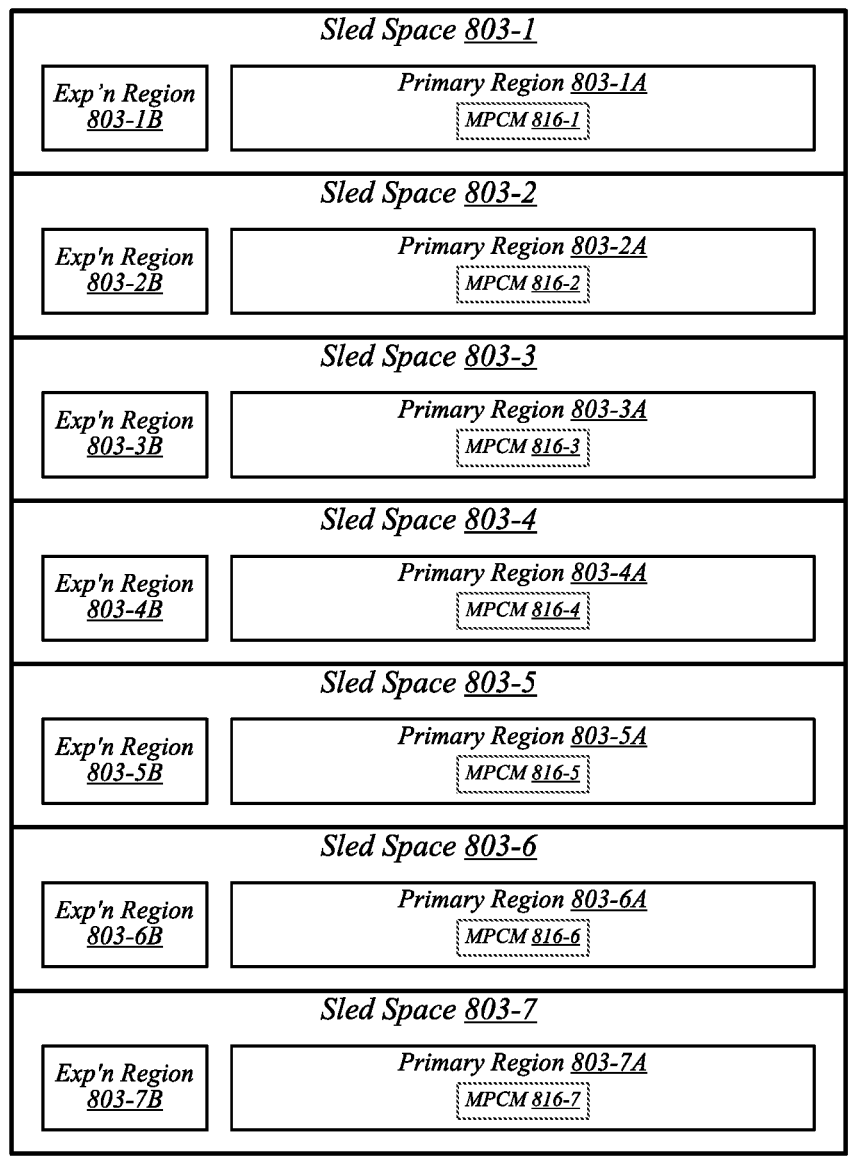
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
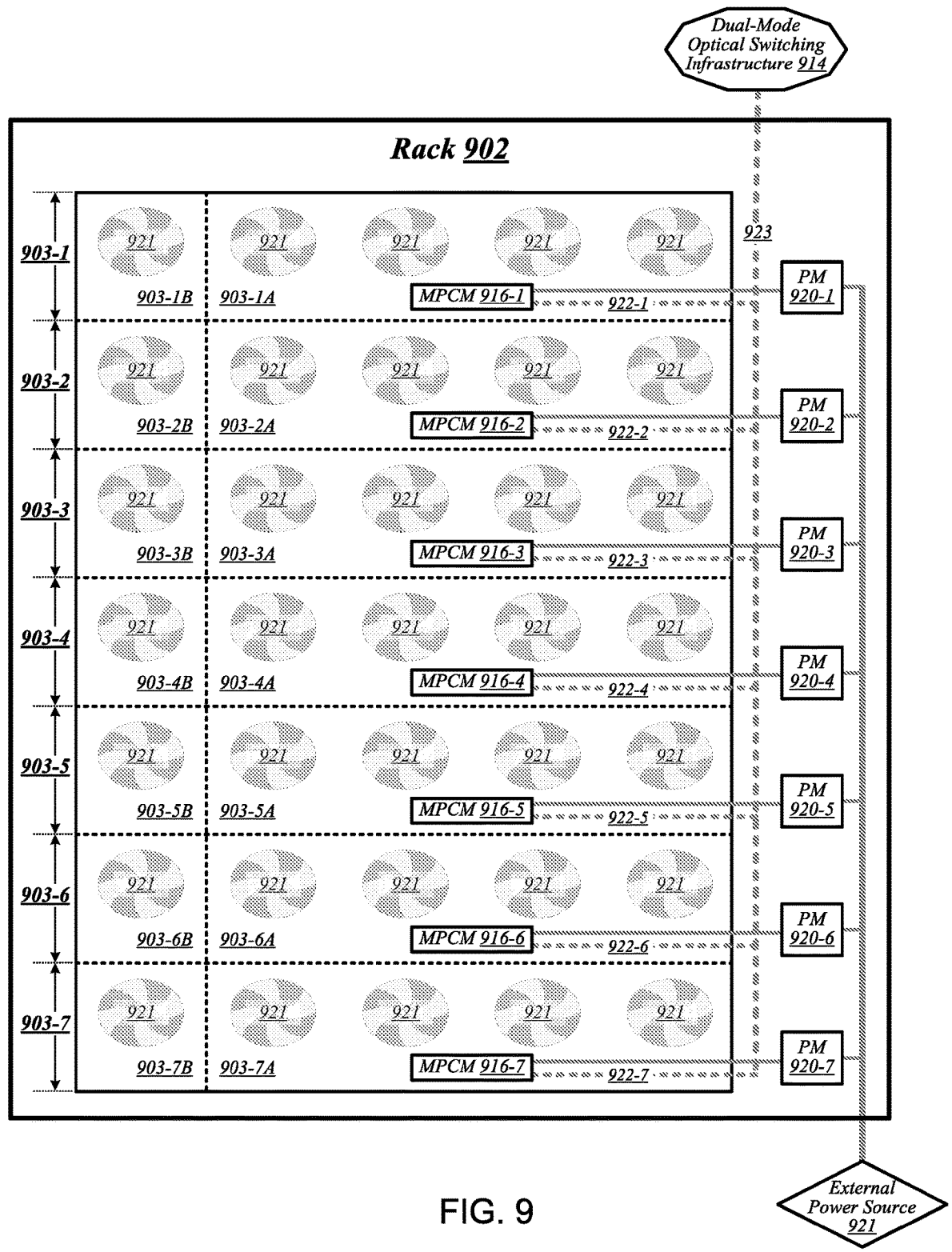
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1 U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
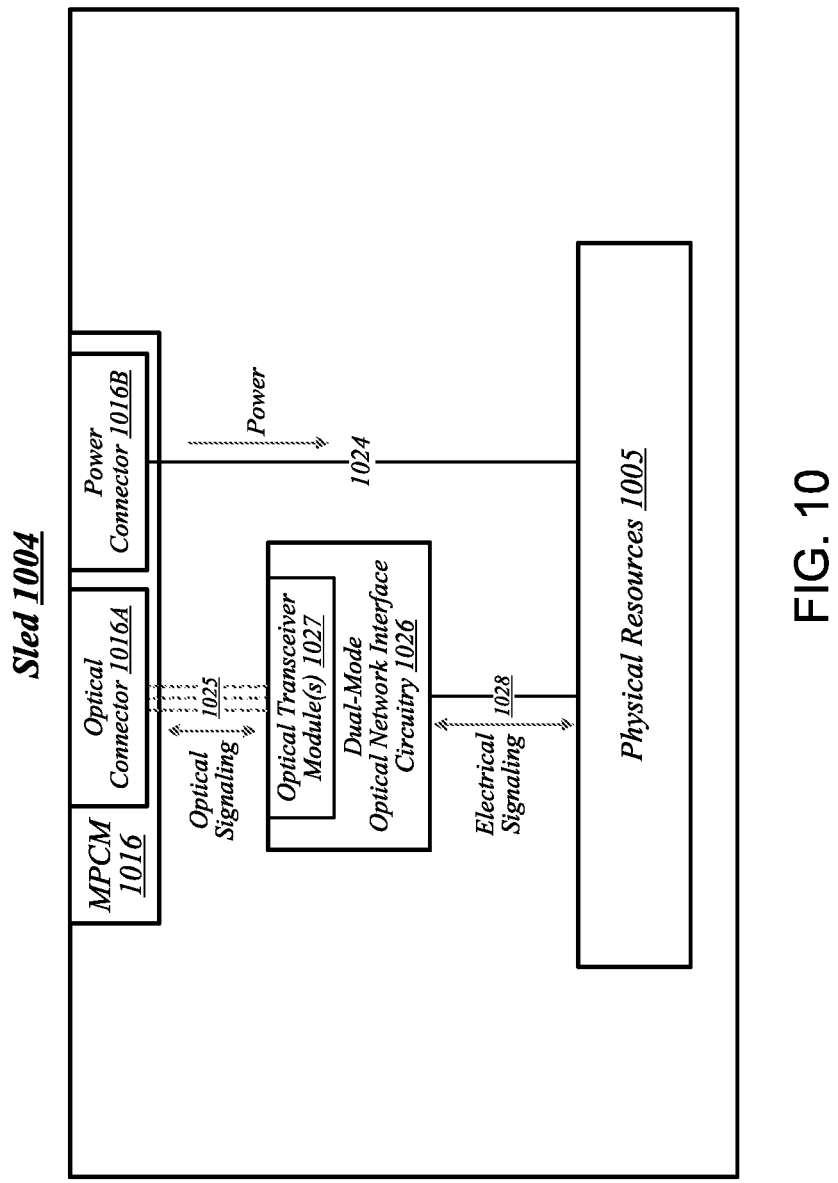
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9.

In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
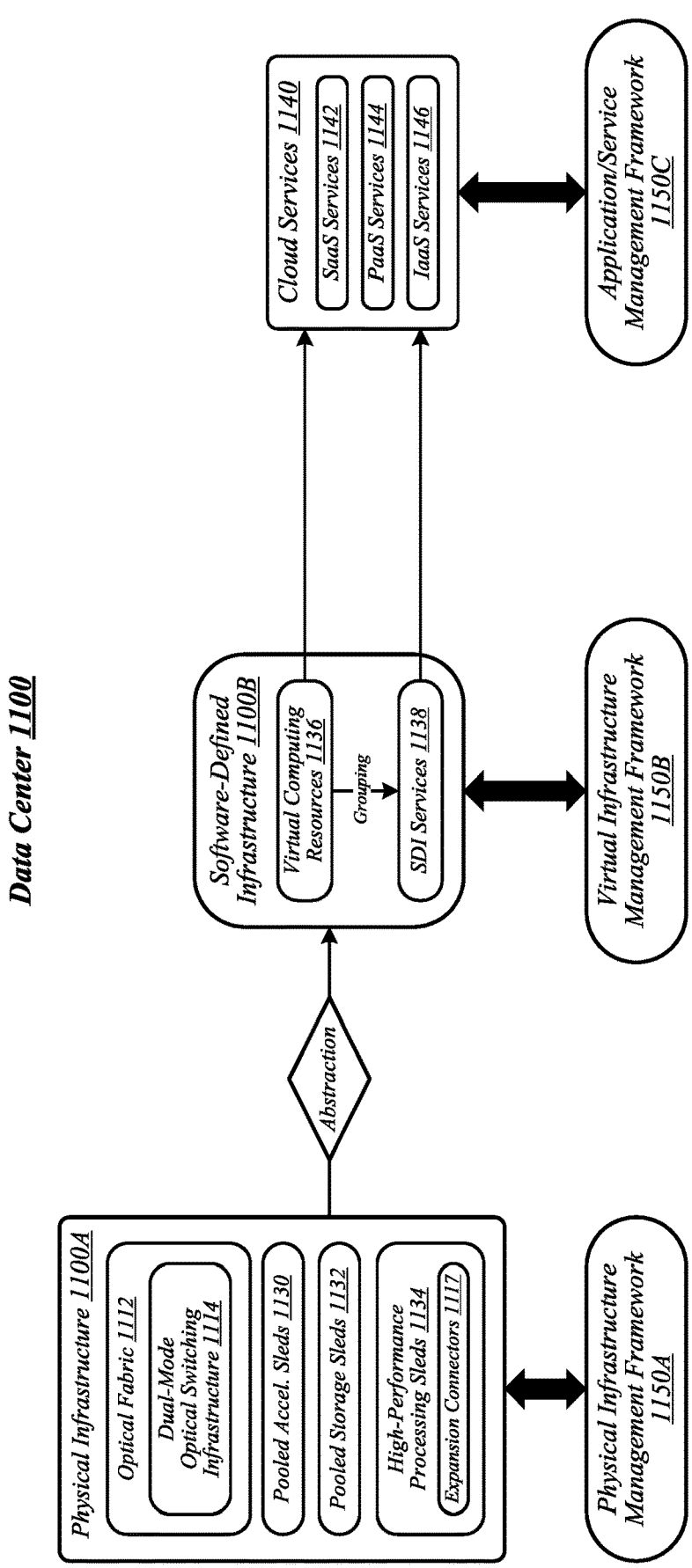
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
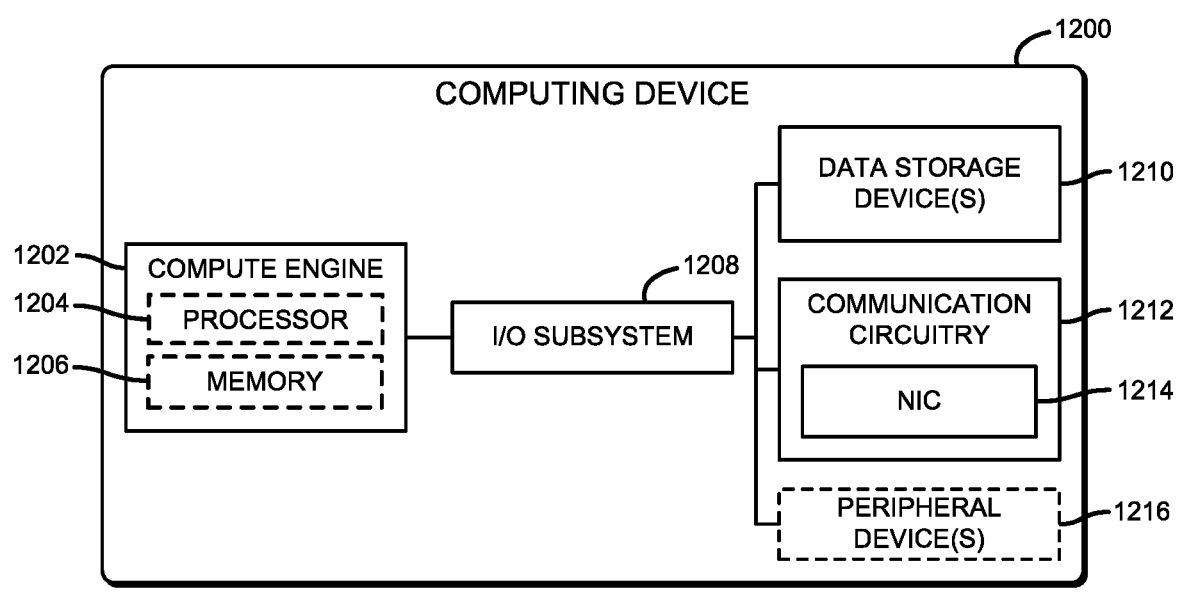
FIG. 12 is a simplified block diagram of at least one embodiment of a computing device for processing network packets in an agent-mesh architecture.

Referring now to FIG. 12, an illustrative computing device 1200 for processing network packets in an agent-mesh architecture includes, among other components, a compute engine 1202, a data storage device 1210, and communication circuitry 1212. The computing device 1200 may be embodied as a server (e.g., a stand-alone server, a rack server, a blade server, etc.), a compute node, a storage node, a switch (e.g., a disaggregated switch, a rack-mounted switch, a standalone switch, a fully managed switch, a partially managed switch, a full-duplex switch, and/or a half-duplex communication mode enabled switch), a router, and/or a sled in a data center (e.g., one of the sleds 204, 404, 504, 1004, 1130, 1132, 1134), any of which may be embodied as one or more physical and/or virtual devices.

In use, as described in further detail below, a network interface controller (NIC) of the computing device 1200 (e.g., the NIC 1214 of the communication circuitry 1212) receives a network packet from another computing device (not shown). The other computing device may be embodied as any type of computing device, such as a mobile computing device (e.g., a smartphone, a laptop/tablet computing device, a wearable computing device, etc.), a desktop computing device, an internet of things (IoT) device, a server (e.g., stand-alone, rack-mounted, blade, etc.), a switch (e.g., a disaggregated switch, a rack-mounted switch, a standalone switch, a fully managed switch, a partially managed switch, a full-duplex switch, and/or a half-duplex communication mode enabled switch), a router, a network appliance, a web appliance, a distributed computing system, a processor-based system, and/or a multiprocessor system, any of which may be embodied as one or more physical and/or virtual devices. In an illustrative embodiment, the source computing device may be embodied as a server sled, such as one of the sleds 204, 404, 504, 1004, 1130, 1132, 1134 described above.

Upon receiving the network packet, a network fabric interface (e.g., the network fabric interface 1310 of FIG. 13) of the NIC 1214 is configured to write the contents of the received network packet (e.g., the header(s), payload, footer(s), etc.) in a distributed fashion to a memory fabric (e.g., the memory fabric 1308 of FIG. 13) of the NIC 1214. Accordingly, it should be appreciated that the memory fabric 1308 includes multiple memory storage components (not shown) referred to herein as segments, each of which are usable to support the storage of the contents of the received network packet. The network fabric interface 1310 is additionally configured to, subsequent to having written the contents of the received network packet to the memory fabric, transmit an event message to a packet processor, illustratively shown as the flexible packet processor (FXP) 1324 of the illustrative NIC 1214 in FIG. 13, indicating the network packet has been received.

Upon having received the event message, the FXP 1324 is configured to read at least a portion of the network packet from the corresponding location(s) of the memory fabric 1308 in which the relevant portion(s) have been written to, such that the FXP 1324 can identify any applicable agent(s) that have requested to be notified when a particular type of network packet has been received. Such agents may include any type of accelerator agent (e.g., a remote direct memory access (RDMA) agent, a cryptography agent, etc.), one or more on-die cores, an embedded management processor, a traffic manager, etc. To facilitate the communications, the FXP 1324 and each agent includes a corresponding agent fabric interface (see, e.g., the memory fabric interfaces 1304 of FIG. 13), which is usable to provide a unified protocol to communicate across the memory fabric 1308. Accordingly, the various agents may perform an action (e.g., read/write, additional processing, trigger other actions, etc.) in response to having received the event message, before the host fabric interface (e.g., the host fabric interface 1318) sends the network packet from the memory fabric to the host memory (e.g., over Peripheral Component Interconnect Express (PCIe) or some other physical interconnect type), whereby further processing/action may be undertaken by the host.

As illustratively shown in FIG. 12, in addition to the previously noted compute engine 1202, data storage device(s) 1210, and communication circuitry 1212, the computing device 1200 additionally includes an input/output (I/O) subsystem 1208 and, in some embodiments, one or more peripheral devices 1216. Of course, in other embodiments, the computing device 1200 may include other or additional components, such as those commonly found in a computing device (e.g., a power supply, cooling component(s), a graphics processing unit (GPU), etc.). Additionally, in some embodiments, one or more of the illustrative components may be incorporated in, or otherwise form a portion of, another component.

The compute engine 1202 may be embodied as any type of device or collection of devices capable of performing various compute functions described below. In some embodiments, the compute engine 1202 may be embodied as a single device such as an integrated circuit, an embedded system, an FPGA, a system-on-a-chip (SoC), or other integrated system or device. Additionally, in some embodiments, the compute engine 1202 includes or may otherwise be embodied as a processor 1204 and a memory 1206. The processor 1204 may be embodied as any type of processor capable of performing the functions described herein. For example, the processor 1204 may be embodied as one or more single or multi-core processors, a microcontroller, or other processor or processing/controlling circuit. In some embodiments, the processor 1204 may be embodied as, include, or otherwise be coupled to an FPGA, an application specific integrated circuit (ASIC), reconfigurable hardware or hardware circuitry, or other specialized hardware to facilitate performance of the functions described herein.

The memory 1206 may be embodied as any type of volatile (e.g., dynamic random access memory (DRAM), etc.) or non-volatile memory or data storage capable of performing the functions described herein. It should be appreciated that the memory 1206 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 1206 may be integrated into the processor 1204. In operation, the memory 1206 may store various software and data used during operation such as job request data, kernel map data, telemetry data, applications, programs, libraries, and drivers.

The compute engine 1202 is communicatively coupled to other components of the computing device 1200 via the I/O subsystem 1208, which may be embodied as circuitry and/or components to facilitate input/output operations with the compute engine 1202 (e.g., with the processor 1204 and/or the memory 1206) and other components of the computing device 1200. For example, the I/O subsystem 1208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1208 may form a portion of a SoC and be incorporated, along with one or more of the processor 1204, the memory 1206, and other components of the computing device 1200, into the compute engine 1202.

The one or more data storage devices 1210 may be embodied as any type of devices configured for short-term or long-term storage of data such as, for example, memory devices and circuits, memory cards, hard disk drives, solid-state drives, or other data storage devices. Each data storage device 1210 may include a system partition that stores data and firmware code for the data storage device 1210. Additionally, each data storage device 1210 may also include an operating system partition that stores data files and executables for an operating system.

The communication circuitry 1212 may be embodied as any communication circuit, device, or collection thereof, capable of enabling network communications between the computing device 1200 and another computing device (e.g., a source computing device) over a network (not shown). Such a network may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Accordingly, the communication circuitry 1212 may be configured to use any one or more communication technology (e.g., wired or wireless communications) and associated protocols (e.g., Ethernet, Bluetooth®, Wi-Fi®, WiMAX, etc.) to effect such communication. The illustrative communication circuitry 1212 includes a network interface controller (NIC) 1214, which may also be referred to as a host fabric interface (HFI), and is described in further detail in FIG. 13. The NIC 1214 may be embodied as one or more add-in-boards, daughter cards, network interface cards, controller chips, chipsets, or other devices that may be used by the computing device 1200 to transmit/receive network communications to/from another computing device.

The peripheral device(s) 1216 may include any type of device that is usable to input information into the computing device 1200 and/or receive information from the computing device 1200. The peripheral devices 1216 may be embodied as any auxiliary device usable to input information into the computing device 1200, such as a keyboard, a mouse, a microphone, a barcode reader, an image scanner, etc., or output information from the computing device 1200, such as a display, a speaker, graphics circuitry, a printer, a projector, etc. It should be appreciated that, in some embodiments, one or more of the peripheral devices 1216 may function as both an input device and an output device (e.g., a touchscreen display, a digitizer on top of a display screen, etc.). It should be further appreciated that the types of peripheral devices 1216 connected to the computing device 1200 may depend on, for example, the type and/or intended use of the computing device 1200. Additionally or alternatively, in some embodiments, the peripheral devices 1216 may include one or more ports, such as a USB port, for example, for connecting external peripheral devices 1216 to the computing device 1200.

Figure 13:
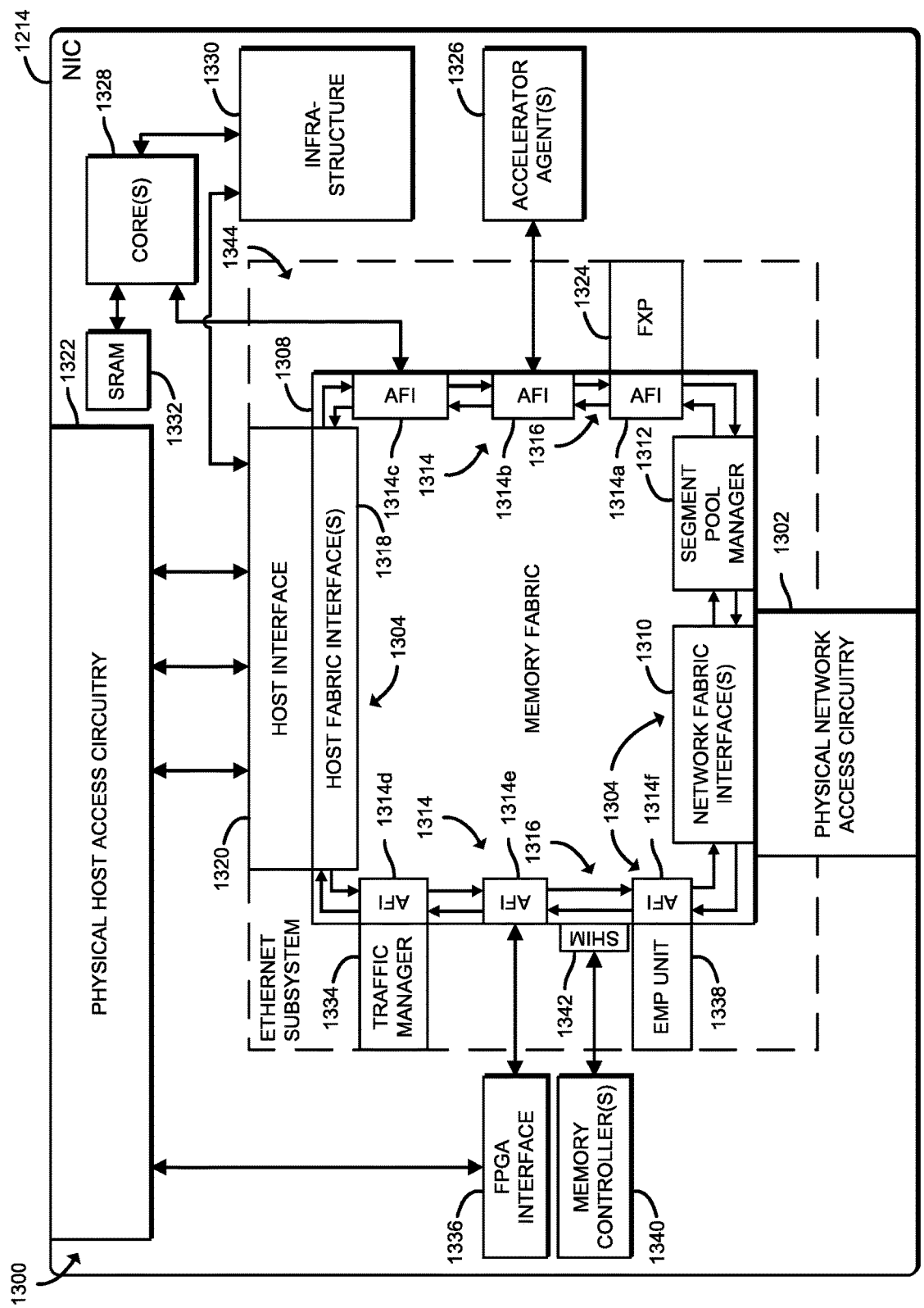
FIG. 13 is a simplified block diagram of at least one embodiment of an environment that may be established by a network interface controller (NIC) of the computing device of FIG. 12.

Referring now to FIG. 13, the NIC 1214 of the computing device 1200 of FIG. 12 may establish an environment 1300 during operation. The illustrative environment 1300 includes physical network access circuitry 1302, an Ethernet subsystem 1344, one or more accelerator agents 1326, one or more processing cores 1328, an infrastructure 1330, physical host access circuitry 1322, an FPGA interface 1336, and one or more memory controllers 1340. The various components of the environment 1300 may be embodied as hardware, firmware, software, or a combination thereof. As such, in some embodiments, one or more of the components of the environment 1300 may be embodied as circuitry or collection of electrical devices. Additionally, in some embodiments, one or more of the illustrative components may form a portion of another component and/or one or more of the illustrative components may be independent of one another.

The physical network access circuitry 1302 is configured to receive inbound network traffic and route/transmit outbound network traffic. To facilitate the receipt of inbound and transmission of outbound network communications (e.g., network traffic, network packets, network flows, etc.) to/from the computing device 1200, the physical network access circuitry 1302 is configured to manage (e.g., create, modify, delete, etc.) connections to physical and virtual network ports (i.e., virtual network interfaces) of the NIC 1214, as well as the ingress/egress buffers/queues associated therewith. The physical network access circuitry 1302 is additionally configured to forward network packets received at the physical network access circuitry 1302 to the Ethernet subsystem 1344, such as may be forwarded via one or more physical or virtual Ethernet lanes.

As noted previously, the memory fabric 1308 includes a number of memory fabric interfaces 1304 usable to communicate across the memory fabric 1308 via a unified protocol. The illustrative memory fabric interfaces 1304 include one or more network fabric interfaces 1310, multiple agent fabric interfaces 1314 (e.g., agent fabric interfaces 1314a, 1314b, 1314c, 1314d, 1314e, and 1314f), and one or more host fabric interfaces 1318. To facilitate allocation and deallocate of memory fabric segments by the memory fabric interfaces 1304, each of the memory fabric interfaces 1304 is communicatively coupled to a communication link 1316.

As illustratively shown, the agent fabric interface 1314a is configured to function as the communication interface for the FXP 132, while the agent fabric interface 1314b is configured to function as the communication interface for the accelerator agent(s) 1326. It should be appreciated that the agent fabric interface 1314b may include more than one agent fabric interface 1314 (e.g., one agent fabric interface 1314 for each accelerator agent 1326). As also illustratively shown, the agent fabric interface 1314c is configured to function as the communication interface for the on-die cores, the agent fabric interface 1314d is configured to function as the communication interface for the traffic manager 1334, the agent fabric interface 1314e is configured to function as the communication interface for the FPGA interface 1336, and the agent fabric interface 1314f is configured to function as the communication interface for the embedded management processor (EMP) unit 1338.

The illustrative memory fabric 1308 additionally includes a segment pool manager 1312, which is configured to manage the requests to read/write data to/from the segments (not shown) of the memory fabric 1308. To manage the requests, in some embodiments, the requests may be transmitted from the respective memory fabric interface 1304 to the segment pool manager 1312. In other words, the segment pool manager 1312 is configured to communicate with the memory fabric interfaces 1304, rather than directly with the agents (e.g., the one or more accelerator agents 1326, the one or more on-die cores 1328, the EMP unit 1338, the traffic manager 1134, etc.). The segment pool manager 1312 is additionally configured to allocate segments (i.e., fabric memory units) of memory of the memory fabric 1308, as well as de-allocate allocated segments of memory of the memory fabric 1308. In some embodiments, the segment pool manager 1312 may be configured to allocate each segment of memory of the memory fabric 1308 using a fixed size (e.g., 256 Bytes). Further, the segment pool manager 1312 is configured to indicate where data blocks of a network packet are written to the memory fabric 1308, such as may be indicated by a segment pointer usable to identify the write location of a particular segment.

The host fabric interfaces 1318 are configured to function as an interface between the memory fabric 1308 and the host interface 1320 of the Ethernet subsystem 1344, which itself is configured to function as an interface between the physical host access circuitry 1322 and the host fabric interfaces 1318. Accordingly, the host fabric interfaces 1318 may be configured to direct the allocation and writing of network packet data to the memory fabric 1308, as well as read and deallocate network packet data from the memory fabric 1308. The physical host access circuitry 1322 is configured to interface with one or more host processors of the computing device (e.g., the processor 1204 of the compute engine 1202 of FIG. 12) via one or more communication links, such as PCIe interconnects, to provide access to host memory (e.g., the memory 1206 of the compute engine 1202 of FIG. 12).

The illustrative environment 1300 of the NIC 1214 includes one or more on-die cores 1328, which are communicatively coupled to the memory fabric 1308 via the agent fabric interface 1314c and the infrastructure 1330. Accordingly, the on-die cores 1328 can provide computational power to perform certain operations without the data being operated on having to be moved to a location remote of the NIC 1214, thereby eliminating the latency otherwise introduced by moving the data. The infrastructure 1330 may include various components to manage the communications, state, and controls of the on-die cores 1328 and/or the host interface 1320, such as a serial communication interface (e.g., a universal asynchronous receiver and transmitter (UART), a serial peripheral interface (SPI) bus, etc.), a testing/debugging interface, a digital thermal sensor, I/O controllers, etc. The SRAM 1332 is communicatively coupled to the on-die cores 1328 and may be used to temporarily store data (e.g., work queues, notifications, interrupts, etc.) for the on-die cores 1328.

The illustrative Ethernet subsystem 1344 additionally includes the traffic manager 1334 communicatively coupled to the agent fabric interface 1314d and the EMP unit 1338 communicatively coupled to the agent fabric interface 1314f. The traffic manager 1334 is configured to perform traffic-management in the packet-processing data path, such as may be performed to enforce service-level agreements (SLAs). The EMP unit 1338 is configured to handle all management duties that cannot be performed by the device drivers, and must be carried out on-chip, such as power-on sequences, handling admin queue commands, initializing Ethernet ports, participating in various fabric configuration protocols, fielding received configuration requests, and handling special configuration requests received off an Ethernet port.

The illustrative environment 1300 of the NIC 1214 additionally includes an FPGA interface 1336 communicatively coupled to the agent fabric interface 1314e and one or more memory controllers 1340 communicatively coupled to the memory fabric 1308 via a corresponding shim 1342. The FPGA interface is configured to interface with an FPGA module/device (not shown) of the computing device 1200 such as via a coherent, low-latency interconnect facilitated by the physical host access circuitry 1322. The memory controllers 1340 may be double data rate (DDR) memory controllers configured to drive DDR SDRAM external to, but managed by the NIC 1214 rather than the host (e.g., the processor 1204 of the compute engine 1202 of FIG. 12).

Figure 14:
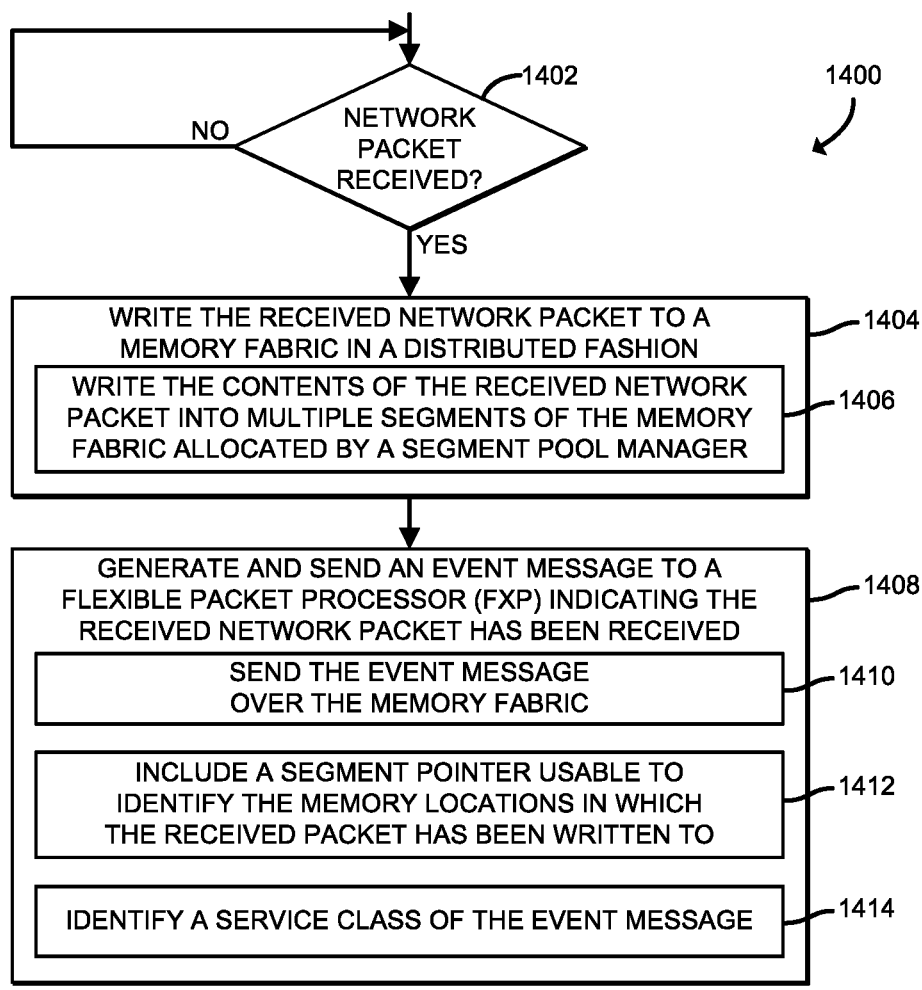
FIG. 14 is a simplified flow diagram of at least one embodiment of a method for generating an event message in response to receiving a network packet that may be performed by the NIC of FIGS. 12 and 13.

Referring now to FIG. 14, in use, the computing device 1200, or more particularly the NIC 1214 of the computing device 1200, may execute a method 1400 for generating an event message in response to receiving a network packet. It should be appreciated that, in some embodiments, the operations of the method 1400 may be performed by one or more components of the environment 1300 of the NIC 1214 as shown in FIG. 13. The method 1400 begins in block 1402, in which the NIC 1214 determines whether a network packet has been received (e.g., at a network fabric interface 1310 via the physical network access circuitry 1302). If so, the method 1400 advances to block 1404, in which the NIC 1214, or more particularly the network fabric interface 1310 of the NIC 1214, writes the received network packet to a memory fabric (e.g., the memory fabric 1308 of FIG. 13) in a distributed fashion. To do so, in block 1406, the network fabric interface 1310 writes the contents (e.g., the header(s), payload, and footer(s)) of the received network packet into multiple segments of the memory fabric 1308 previously allocated by a segment pool manager (e.g., the segment pool manager 1312 of FIG. 13).

In block 1408, the network fabric interface 1310 generates and sends an event message to the FXP (e.g., the FXP 1324 of FIG. 13) indicating the received network packet has been received. It should be appreciated that, in some embodiments, the network fabric interface 1310 may include some processing capability such that some analysis may be performed by the network fabric interface 1310 without the need to involve the FXP 1324. For example, in such embodiments, the network fabric interface 1310 may be configured to identify certain flows that the network fabric interface 1310 may use to identify one or more agents for additional processing of the network packet using a similar technique to that described in the method 1500 of FIG. 15 described herein as being performed by the FXP 1324.

To send the event message, in block 1410, the network fabric interface 1310 uses a dedicated mesh layer (not shown) of the memory fabric 1308. Additionally, in block 1412, the network fabric interface 1310 includes a segment pointer usable to identify the memory locations in which the received network packet has been written to. Further, in block 1414, the network fabric interface 1310 identifies a service class of the event message. Depending on the embodiment, each service class may have a different allocation of system resources, as well as a different priority level associated therewith. Irrespective on the resources allocated to or the priority of a service class, it should be appreciated that each service class has a separate allocation of resources such that there is no head-of-line (HOL) blocking between service classes.

Various inputs may be used to determine the service class, such as a traffic class associated with the network packet, an event type (e.g., a receive packet event, a transmit packet event, a non-packet event, etc.), an associated network port, and a current processing step being performed in response to a received event message. For example, the FXP 1324 may be processing receive packet events that are coming directly from the network fabric interface 1310, as well as receive packet events that have already been processed by the FXP 1324 in a first pass and have then gone through an agent (e.g., a crypto accelerator for decryption) and have since been sent back to FXP 1324 to process the modified network packet (e.g., the decrypted packet). Under such conditions, each event may have a different identifier (e.g., pre-FXP vs post-decrypt). As such, the different identifier may cause the classification to result in different service classes such that the pre-FXP packet event messages can be isolated (e.g., no HOL blocking) from the post-decrypt packet events. Accordingly, the FXP 1324 may take a particular action upon receipt of the event message based on the classification, such as prioritize one service class type over another service class type, send the event message to a host interface device 1310 or an agent fabric interface device 1314, etc.

Figure 15:
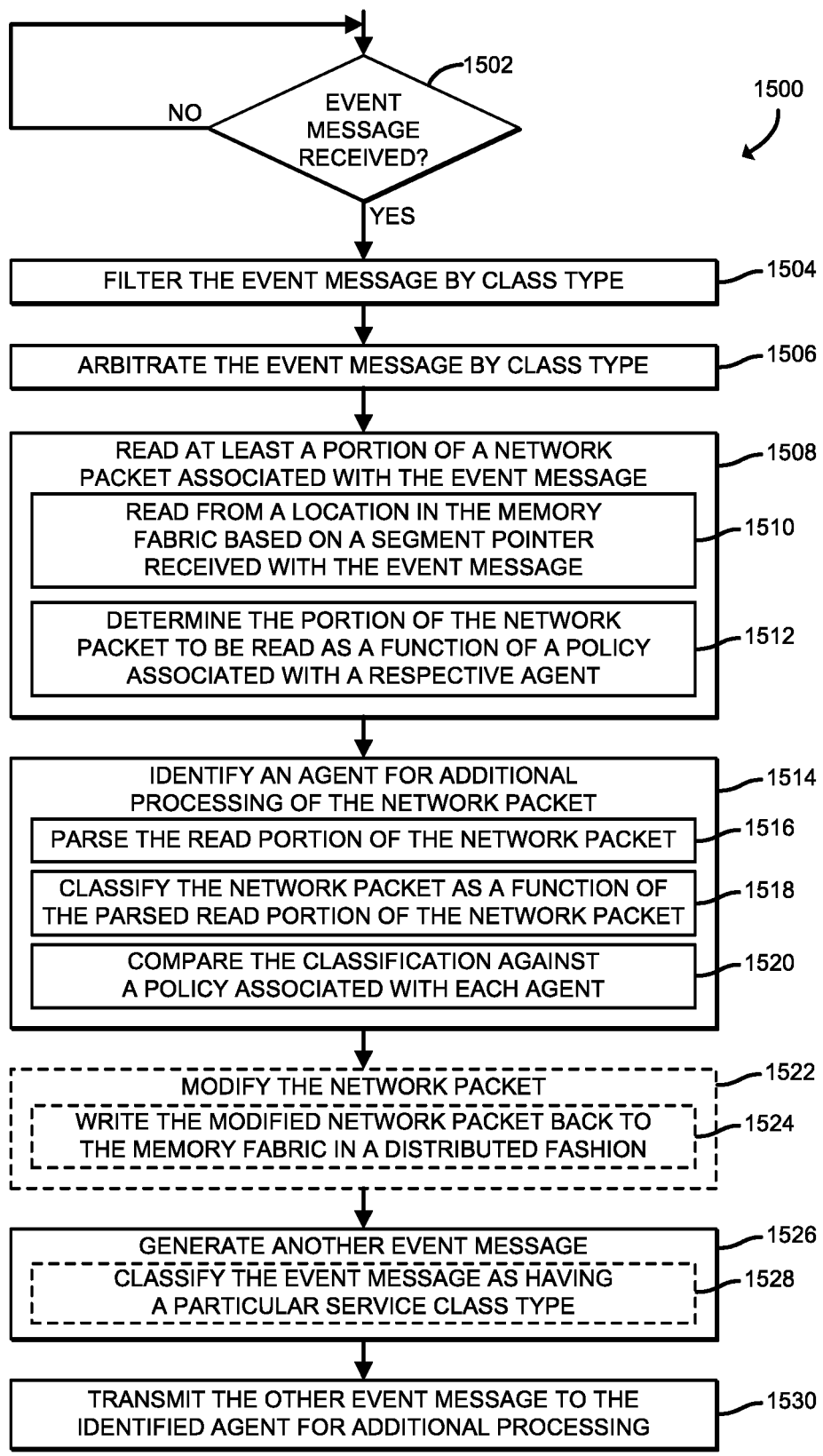
FIG. 15 is a simplified flow diagram of at least one embodiment of a method for processing inbound network packets in an agent-mesh architecture that may be performed by the NIC of FIGS. 12 and 13.

Referring now to FIG. 15, in use, the computing device 1200, or more particularly the NIC 1214 of the computing device 1200, may execute a method 1500 for processing inbound network packets in an agent-mesh architecture. It should be appreciated that, in some embodiments, the operations of the method 1500 may be performed by one or more components of the environment 1300 of the NIC 1214 as shown in FIG. 13. The method 1500 begins in block 1502, in which the NIC 1214, or more particularly the FXP 1324 of the NIC 1214, determines whether an event message has been received from the network fabric interface 1310 (e.g., in response to having received the network packet associated with the event message). If so, the method 1500 advances to block 1504, in which the FXP 1324 filters the event message by class type.

In other words, the FXP 1324 determines the service class assigned to the received event message. In block 1506, the FXP 1324 arbitrates the event message as a function of the designated service class type. As described previously, the service class event may include multiple service class types. In some embodiments, the FXP 1324 may identify arbitrate a service class type designated event message based on one or more fields within the event (e.g., metadata of the event). In other words, the FXP 1324 may queue the received event message in a queue associated with the designated class type and perform the remaining operations of the method 1500 upon the received event message being dequeued from the respective event message queue. It should be appreciated that, in some embodiments, one service class queue having a particular service class type may have a higher priority than another service class queue having another service class type.

In block 1508, the FXP 1324 reads at least a portion of the network packet (e.g., at least a portion of the header(s), the payload, and/or the footer(s)) associated with the event message. To do so, in block 1510, the FXP 1324 reads at least the portion of the network packet from a segment located in the memory fabric 1308, the segment location having been determined based on a segment pointer received with the event message. Additionally, in block 1512, the FXP 1324 determines the portion of the network packet to be read based on a policy (e.g., a usage model) associated with a respective agent that is to receive the event message.

In block 1514, the FXP 1324 identifies one or more agents (see, e.g., connected to the FXP via the memory fabric interfaces 1304 of FIG. 13) for additional processing of the network packet. As described previously, the agents may include any type of accelerator agent 3126 (e.g., a remote direct memory access (RDMA) agent, a cryptography agent, etc.), one or more on-die cores 1328, an EMP unit 1338, a traffic manager 1334, etc. To identify the agent(s), in block 1516, the FXP 1324 parses the read portion of the network packet. Additionally, in block 1518, the FXP 1324 classifies the network packet as a function of the parsed read portion of the network packet. Further, in block 1520, the FXP 1324 compares the classification against a policy associated with each available agent to identify the agent for additional processing. It should be appreciated that, under certain conditions, more than one agent may need to process the network packet (e.g., in serial or parallel with the identified agent).

In block 1522, under certain conditions, the FXP 1324 may modify the network packet. If so, in block 1524, the FXP 1324 writes the modified network packet back to the memory fabric 1308 in a distributed fashion (e.g., across multiple segments of the memory fabric 1308). In block 1526, the FXP 1324 generates another event message. In block 1528, the FXP 1324 classifies the event message as having a particular service class. As described previously, the service class classification performed by the FXP 1324 may be based on one or more parameters of the event message, such as a classification of the network packet associated with the event message, results of a modification to the network packet, another agent which has been identified to receive the event message, the final agent identified to receive the event message, an associated traffic class, etc. Accordingly, it should be appreciated that, under certain conditions, such as the network packet having been modified in block 1522, the assigned service class of the event message received in block 1502 may be different than the classification assigned to the event message generated in block 1526.

In block 1530, the FXP 1324 transmits the other event message generated in block 1526 to the identified agent(s) for additional processing before the network packet is sent to the appropriate host (e.g., via the host fabric interface 1318). For example, the FXP 1324 may transmit the event message to an FPGA via the FPGA interface 1336 and the agent fabric interface 1314e, to the on-die core(s) 1328 via the agent fabric interface 1314c, the accelerator agent(s) (e.g., the RDMA agent, the cryptography agent, etc.) via the agent fabric interface 1314b, or a custom Internet Protocol (IP) address.

Figure 16:
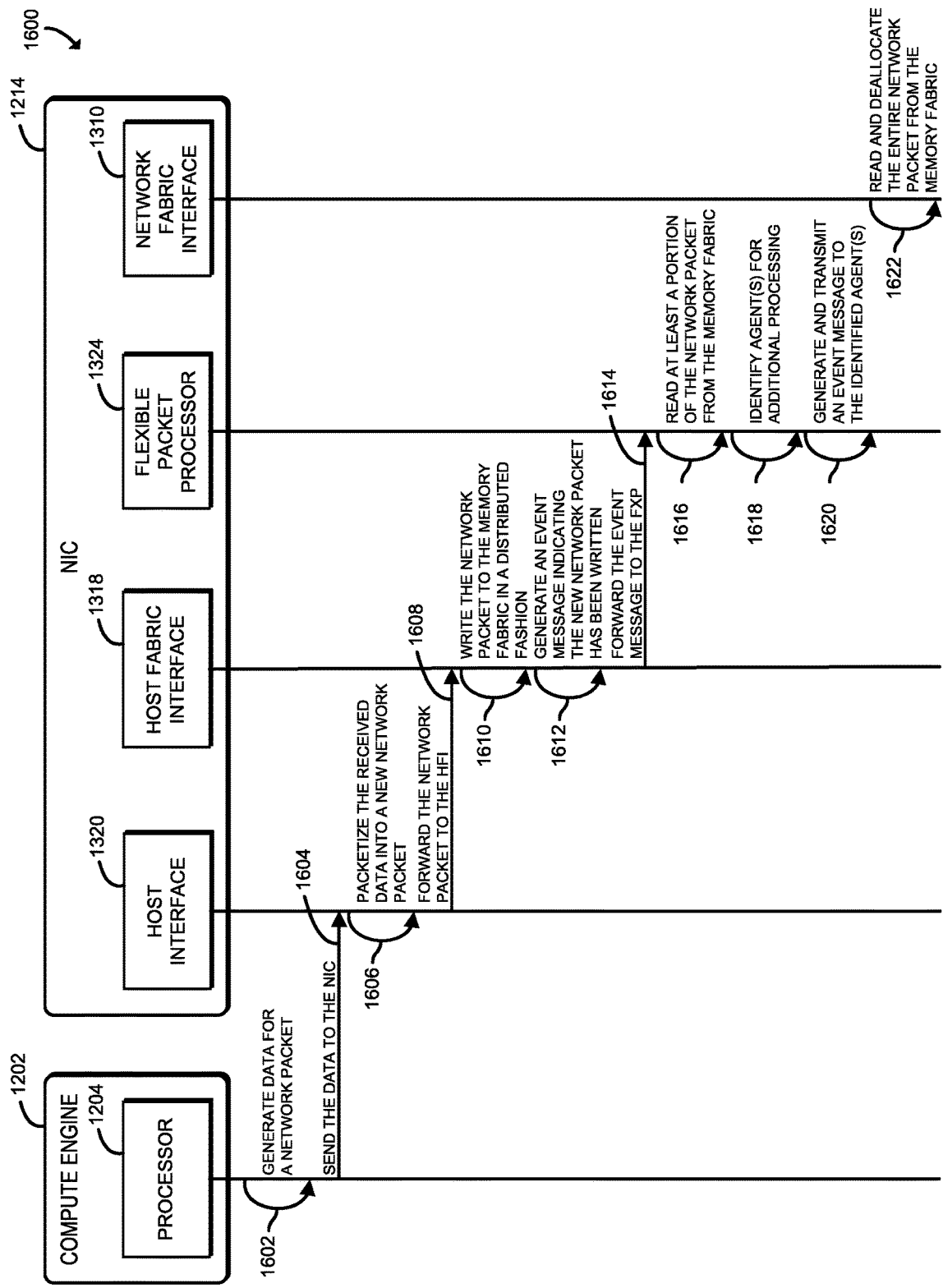
FIG. 16 is a simplified communication flow diagram of at least one embodiment for processing outbound network packets in an agent-mesh architecture that may be performed by the NIC of FIGS. 12 and 13.

Referring now to FIG. 16, an embodiment of a communication flow 1600 for processing outbound network packets in an agent-mesh architecture includes the compute engine 1202 of FIG. 12 and the NIC of FIGS. 12 and 13. The illustrative communication flow 1600 includes a number of data flows, some of which may be executed separately or together, depending on the embodiment. In data flow 1602, the processor 1204 of the compute engine 1202 generates data for a network packet to be transmitted to another computing device (not shown). In data flow 1604, the processor 1204 sends the data to the NIC 1214, or more particularly to the host interface 1320 (e.g., via the physical host access circuitry 1322 of FIG. 13). In data flow 1606, the host interface 1320 packetizes the received data and, in data flow 1608, forwards the network packet to the host fabric interface 1318.

In data flow 1610, the host fabric interface 1318 writes the network packet to the memory fabric (e.g., the memory fabric 1308 of FIG. 13) in a distributed fashion (e.g., across multiple segments of the memory fabric 1308). In data flow 1612, the host fabric interface 1318 generates an event message (e.g., a new network packet event message) indicating the new network packet has been written to the memory fabric 1308. It should be appreciated that, in some embodiments, the host fabric interface 1318 may include some processing capability such that some analysis may be performed by the network fabric interface 1310 without the need to involve the FXP 1324. For example, in such embodiments, the host fabric interface 1318 may be configured to identify certain flows that the host fabric interface 1318 may use to identify the one or more agents for additional processing of the network packet using a similar technique to that described in the data flows 1616-1620 described herein as being performed by the FXP 1324.

In data flow 1614, the host fabric interface 1318 forwards the event message to the FXP 1324. Upon receipt of the event message, in data flow 1616, the FXP 1324 fetches and reads at least a portion of the new network packet from the memory fabric 1308. To do so, it should be appreciated that the event message may include a pointer usable to identify the location in the memory fabric 1308 at which the new network packet has been stored. In data flow 1618, the FXP 1324 identifies one or more agents (e.g., the one or more accelerator agents 1326, the one or more on-die cores 1328, the EMP unit 1338, the traffic manager 1134, etc.) of the NIC 1214 which are configured to perform additional processing on the new network packet prior to transmission from the NIC 1214. In data flow 1620, the FXP 1324 generates and transmits an event message (e.g., a network packet transmit event message) to the identified agent(s). In data flow 1622, the network fabric interface 1310, in response to having received an indication from the identified agent(s) that the additional processing operations performed thereby have been completed, read and deallocates the entire network packet from the memory fabric 1308 for transmission to another computing device.

Examples

Illustrative examples of the technologies disclosed herein are provided below. An embodiment of the technologies may include any one or more, and any combination of, the examples described below.

Example 1 includes a computing device for processing network packets in an agent-mesh architecture, the computing device comprising a compute engine; and a network interface controller (NIC) having a packet processor communicatively coupled to a memory fabric of the NIC and a plurality of agents, wherein each of the plurality of agents are communicatively coupled to the memory fabric via a corresponding agent fabric interface of the memory fabric, wherein the NIC is to write, by a network fabric interface of the memory fabric, a received network packet to the memory fabric in a distributed fashion; generate, by the network fabric interface, an event message indicating the received network packet has been received; send, by the network fabric interface, the generated event message to the packet processor; read, by the packet processor and in response to having received the generated event message, at least a portion of the received network packet from the memory fabric; identify, by the packet processor, an agent of the plurality of agents for additional processing of the received network packet as a function of the read portion of the received network packet; generate, by the packet processor, a network packet received event message indicating a received network packet is available for processing; and transmit, by the packet processor, the network packet received event message to the identified agent.

Example 2 includes the subject matter of Example 1, and wherein to identify the agent for additional processing of the received network packet comprises to parse the read portion of the received network packet; classify the network packet as a function of the parsed read portion of the received network packet; and compare a result of the classification against a policy associated with each of the plurality of agents to identify the agent from the plurality of agents.

Example 3 includes the subject matter of any of Examples 1 and 2, and wherein the NIC is further to modify, by the packet processor, the network packet and write the modified network packet back to the memory fabric in a distributed fashion.

Example 4 includes the subject matter of any of Examples 1-3, and wherein to send the network packet received event message to the packet processor comprises to include a segment pointer usable to identify a location in the memory fabric at which the received network packet has been written to.

Example 5 includes the subject matter of any of Examples 1-4, and wherein to read the portion of the received network packet from the memory fabric comprises to read the portion of the received network packet from the memory fabric based on the segment pointer.

Example 6 includes the subject matter of any of Examples 1-5, and wherein the NIC is further to classify, by the network fabric interface, the event message as one of a traffic class event or a service class event, and wherein to identify the agent comprises to identify the agent as a function of the event classification.

Example 7 includes the subject matter of any of Examples 1-6, and wherein to write the received network packet to the memory fabric comprises to write the received network packet into a plurality of segments of the memory fabric.

Example 8 includes the subject matter of any of Examples 1-7, and wherein the NIC is further to request, by the network fabric interface, a location of each of the plurality of segments of the memory fabric, wherein to write the received network packet into the plurality of segments of the memory fabric comprises to write, in response to having received the location of each of the plurality of segments of the memory fabric in which to store a portion of the received network packet, the received network packet into the received location of each of the plurality of segments of the memory fabric.

Example 9 includes the subject matter of any of Examples 1-8, and wherein to transmit the network packet received event message to the identified agent comprises to transmit the network packet received event message to an agent fabric interface associated with the identified agent.

Example 10 includes the subject matter of any of Examples 1-9, and wherein the NIC is further to read and deallocate, by a host fabric interface of the memory fabric and in response to having received a transfer event message from the packet processor or the agent, the entire received network packet from the memory fabric for transfer to a data storage location managed by the compute engine.

Example 11 includes the subject matter of any of Examples 1-10, and wherein to send the generated event message by the network fabric interface comprises to read, by the network fabric interface, at least a portion of the received network packet from the memory fabric; identify, by the network fabric interface, the agent for additional processing of the received network packet as a function of the read portion of the received network packet; generate, by the network fabric interface, the network packet received event message indicating the received network packet is available for processing; and transmit, by the network fabric interface, the network packet received event message to the identified agent.

Example 12 includes the subject matter of any of Examples 1-11, and wherein the NIC is further to write, by a host fabric interface of the memory fabric, a new network packet received by a host interface of the NIC from the compute engine to the memory fabric in a distributed fashion; generate, by the host fabric interface, a new network packet event message indicating the network packet has been received from the compute engine; send, by the host fabric interface, the new network packet event message to the packet processor; read, by the packet processor and in response to having received the new network packet event message, at least a portion of the new network packet from the memory fabric; identify, by the packet processor, an agent of the plurality of agents for additional processing of the new network packet as a function of the read portion of the new network packet; generate, by the packet processor, a network packet transmit event message indicating the received network packet is available for processing; transmit, by the packet processor, the network packet transmit event message to the identified agent; and read and deallocate, by the network fabric interface and in response to having received an indication from the identified agent that the network packet is to be transmitted to another computing device, the entire network packet from the memory fabric.

Example 13 includes the subject matter of any of Examples 1-12, and wherein to send the new network packet event message by the host fabric interface comprises to read at least a portion of the received network packet from the memory fabric; identify the agent for additional processing of the received network packet as a function of the read portion of the received network packet; generate the new network packet event message indicating the new network packet is available for processing; and transmit the new network packet event message to the identified agent.

Example 14 includes a method for processing network packets by a computing device in an agent-mesh architecture, the method comprising writing, by a network fabric interface of a memory fabric of a network interface controller (NIC) of the computing device, a received network packet to the memory fabric in a distributed fashion; generating, by the network fabric interface, an event message indicating the received network packet has been received; sending, by the network fabric interface, the generated event message to a packet processor communicatively coupled to the memory fabric; reading, by the packet processor and in response to having received the generated event message, at least a portion of the received network packet from the memory fabric; identifying, by the packet processor, an agent of a plurality of agents for additional processing of the received network packet as a function of the read portion of the received network packet, wherein each of the plurality of agents is communicatively coupled to the memory fabric via a corresponding agent fabric interface of the memory fabric; generating, by the packet processor, another event message indicating the received network packet is available for processing; and transmitting, by the packet processor, the other generated event message to the identified agent.

Example 15 includes the subject matter of Example 14, and wherein identifying the agent for additional processing of the received network packet comprises (i) parsing the read portion of the received network packet, (ii) classifying the network packet as a function of the parsed read portion of the received network packet, and (iii) comparing a result of the classification against a policy associated with each of the plurality of agents to identify the agent from the plurality of agents.

Example 16 includes the subject matter of any of Examples 14 and 15, and further including modifying, by the packet processor, the network packet; and writing, by the packet processor, the modified network packet back to the memory fabric in a distributed fashion.

Example 17 includes the subject matter of any of Examples 14-16, and wherein sending the generated event message to the packet processor includes sending the generated event message with a segment pointer usable to identify a location in the memory fabric at which the received network packet has been written to.

Example 18 includes the subject matter of any of Examples 14-17, and wherein reading the portion of the received network packet from the memory fabric comprises reading the portion of the received network packet from the memory fabric based on the segment pointer.

Example 19 includes the subject matter of any of Examples 14-18, and further including classifying, by the network fabric interface, the event message as one of a traffic class event or a service class event, and wherein identifying the agent comprises identifying the agent as a function of the event classification.

Example 20 includes the subject matter of any of Examples 14-19, and wherein writing the received network packet to the memory fabric comprises writing the received network packet into a plurality of segments of the memory fabric.

Example 21 includes the subject matter of any of Examples 14-20, and further including requesting, by the network fabric interface, a location of each of the plurality of segments of the memory fabric, wherein writing the received network packet into the plurality of segments of the memory fabric comprises writing, in response to having received the location of each of the plurality of segments of the memory fabric in which to store a portion of the received network packet, the received network packet into the received location of each of the plurality of segments of the memory fabric.

Example 22 includes the subject matter of any of Examples 14-21, and wherein transmitting the other generated event message to the identified agent comprises transmitting the other generated event message to an agent fabric interface associated with the identified agent.

Example 23 includes the subject matter of any of Examples 14-22, and further including reading and deallocating, by a host fabric interface of the memory fabric and in response to having received a transfer event message from the packet processor or the agent, the entire received network packet from the memory fabric for transfer to a data storage location managed by the compute engine.

Example 24 includes the subject matter of any of Examples 14-23, and wherein sending the generated event message by the network fabric interface comprises reading, by the network fabric interface, at least a portion of the received network packet from the memory fabric; identifying, by the network fabric interface, the agent for additional processing of the received network packet as a function of the read portion of the received network packet; generating, by the network fabric interface, the network packet received event message indicating the received network packet is available for processing; and transmitting, by the network fabric interface, the network packet received event message to the identified agent.

Example 25 includes the subject matter of any of Examples 14-24, and further including writing, by a host fabric interface of the memory fabric, a new network packet received from the compute engine to the memory fabric in a distributed fashion; generating, by the host fabric interface, a new network packet event message indicating the network packet has been received from the compute engine; sending, by the host fabric interface, the new network packet event message to the packet processor; reading, by the packet processor and in response to having received the new network packet event message, at least a portion of the new network packet from the memory fabric; identifying, by the packet processor, an agent of the plurality of agents for additional processing of the new network packet as a function of the read portion of the new network packet; generating, by the packet processor, a network packet transmit event message indicating the received network packet is available for processing; transmitting, by the packet processor, the network packet transmit event message to the identified agent; and reading and deallocating, by the network fabric interface and in response to having received the network packet transmit event message, the entire network packet from the memory fabric.

Example 26 includes the subject matter of any of Examples 14-25, and wherein sending the generated event message by the host fabric interface comprises reading at least a portion of the received network packet from the memory fabric; identifying the agent for additional processing of the received network packet as a function of the read portion of the received network packet; generating the new network packet event message indicating the new network packet is available for processing; and transmitting the new network packet event message to the identified agent.

Example 27 includes one or more machine-readable storage media of a network interface controller (NIC) of a computing device comprising a plurality of instructions stored thereon that, when executed, cause the NIC of to perform the method of any of Examples 14-26.

Example 28 includes a computing device for processing network packets in an agent-mesh architecture, the computing device comprising one or more processors; and a network interface controller (NIC) having stored therein a plurality of instructions that, when executed by the NIC, cause the computing device to perform the method of any of Examples 14-26.

Example 29 includes a computing device for processing network packets in an agent-mesh architecture, the computing device comprising means for writing, by a network fabric interface of a memory fabric of a network interface controller (NIC) of the computing device, a received network packet to the memory fabric in a distributed fashion; means for generating, by the network fabric interface, an event message indicating the received network packet has been received; means for sending, by the network fabric interface, the generated event message to a packet processor communicatively coupled to the memory fabric; means for reading, by the packet processor and in response to having received the generated event message, at least a portion of the received network packet from the memory fabric; means for identifying, by the packet processor, an agent of a plurality of agents for additional processing of the received network packet as a function of the read portion of the received network packet, wherein each of the plurality of agents is communicatively coupled to the memory fabric via a corresponding agent fabric interface of the memory fabric; means for generating, by the packet processor, another event message indicating the received network packet is available for processing; and means for transmitting, by the packet processor, the other generated event message to the identified agent.

Example 30 includes the subject matter of Example 29, and wherein the means for identifying the agent for additional processing of the received network packet comprises means for (i) parsing the read portion of the received network packet, (ii) classifying the network packet as a function of the parsed read portion of the received network packet, and (iii) comparing a result of the classification against a policy associated with each of the plurality of agents to identify the agent from the plurality of agents.

Example 31 includes the subject matter of any of Examples 29 and 30, and further including means for modifying, by the packet processor, the network packet; and means for writing, by the packet processor, the modified network packet back to the memory fabric in a distributed fashion.

Example 32 includes the subject matter of any of Examples 29-31, and wherein the means for sending the generated event message to the packet processor includes means for sending the generated event message with a segment pointer usable to identify a location in the memory fabric at which the received network packet has been written to.

Example 33 includes the subject matter of any of Examples 29-32, and wherein the means for reading the portion of the received network packet from the memory fabric comprises means for reading the portion of the received network packet from the memory fabric based on the segment pointer.

Example 34 includes the subject matter of any of Examples 29-33, and further including means for classifying, by the network fabric interface, the event message as one of a traffic class event or a service class event, and wherein the means for identifying the agent comprises means for identifying the agent as a function of the event classification.

Example 35 includes the subject matter of any of Examples 29-34, and wherein the means for writing the received network packet to the memory fabric comprises means for writing the received network packet into a plurality of segments of the memory fabric.

Example 36 includes the subject matter of any of Examples 29-35, and further including means for requesting, by the network fabric interface, a location of each of the plurality of segments of the memory fabric, wherein the means for writing the received network packet into the plurality of segments of the memory fabric comprises means for writing, in response to having received the location of each of the plurality of segments of the memory fabric in which to store a portion of the received network packet, the received network packet into the received location of each of the plurality of segments of the memory fabric.

Example 37 includes the subject matter of any of Examples 29-36, and wherein the means for transmitting the other generated event message to the identified agent comprises means for transmitting the other generated event message to an agent fabric interface associated with the identified agent.

Example 38 includes the subject matter of any of Examples 29-37, and further including means for reading and deallocating, by a host fabric interface of the memory fabric and in response to having received a transfer event message from the packet processor or the agent, the entire received network packet from the memory fabric for transfer to a data storage location managed by the compute engine.

Example 39 includes the subject matter of any of Examples 29-38, and wherein the means for sending the generated event message by the network fabric interface comprises means for reading, by the network fabric interface, at least a portion of the received network packet from the memory fabric; means for identifying, by the network fabric interface, the agent for additional processing of the received network packet as a function of the read portion of the received network packet; means for generating, by the network fabric interface, the network packet received event message indicating the received network packet is available for processing; and means for transmitting, by the network fabric interface, the network packet received event message to the identified agent.

Example 40 includes the subject matter of any of Examples 29-39, and further including means for writing, by a host fabric interface of the memory fabric, a new network packet received from the compute engine to the memory fabric in a distributed fashion; means for generating, by the host fabric interface, a new network packet event message indicating the network packet has been received from the compute engine; means for sending, by the host fabric interface, the new network packet event message to the packet processor; means for reading, by the packet processor and in response to having received the new network packet event message, at least a portion of the new network packet from the memory fabric; means for identifying, by the packet processor, an agent of the plurality of agents for additional processing of the new network packet as a function of the read portion of the new network packet; means for generating, by the packet processor, a network packet transmit event message indicating the received network packet is available for processing; means for transmitting, by the packet processor, the network packet transmit event message to the identified agent; and means for reading and deallocating, by the network fabric interface and in response to having received the network packet transmit event message, the entire network packet from the memory fabric.

Example 41 includes the subject matter of any of Examples 29-40, and wherein the means for sending the generated event message by the host fabric interface comprises means for reading at least a portion of the received network packet from the memory fabric; means for identifying the agent for additional processing of the received network packet as a function of the read portion of the received network packet; means for generating the new network packet event message indicating the new network packet is available for processing; and means for transmitting the new network packet event message to the identified agent.

The invention claimed is:

1. A computing device for processing network packets in an agent-mesh architecture, the computing device comprising:
a network interface controller (NIC) having a packet processor communicatively coupled to a memory fabric of the NIC and a plurality of agents, wherein each of the plurality of agents are communicatively coupled to the memory fabric via a corresponding agent fabric interface of the memory fabric, wherein the NIC is to:
write, by a network fabric interface of the memory fabric, a received network packet to the memory fabric in a distributed fashion;
generate, by the network fabric interface, an event message indicating the received network packet has been received;
send, by the network fabric interface, the generated event message to the packet processor via an agent fabric interface of the memory fabric associated with the packet processor;
read, by the packet processor and in response to having received the generated event message, at least a portion of the received network packet from the memory fabric;
identify, by the packet processor, an agent of the plurality of agents for additional processing of the received network packet as a function of the read portion of the received network packet;
generate, by the packet processor, a network packet received event message indicating the received network packet is available for processing; and
transmit, by the packet processor, the network packet received event message to the identified agent.

2. The computing device of claim 1, wherein to identify the agent for additional processing of the received network packet comprises to:
parse the read portion of the received network packet;
classify the network packet as a function of the parsed read portion of the received network packet; and
compare a result of the classification against a policy associated with each of the plurality of agents to identify the agent from the plurality of agents.

3. The computing device of claim 1, wherein to send the network packet received event message to the packet processor comprises to include a segment pointer usable to identify a location in the memory fabric at which the received network packet has been written to, and wherein to read the portion of the received network packet from the memory fabric comprises to read the portion of the received network packet from the memory fabric based on the segment pointer.

4. The computing device of claim 1, wherein the NIC is further to classify, by the network fabric interface, the event message as one of a traffic class event or a service class event, and wherein to identify the agent comprises to identify the agent as a function of the event classification.

5. The computing device of claim 1, wherein to write the received network packet to the memory fabric comprises to write the received network packet into a plurality of segments of the memory fabric.

6. The computing device of claim 5, wherein the NIC is further to request, by the network fabric interface, a location of each of the plurality of segments of the memory fabric, wherein to write the received network packet into the plurality of segments of the memory fabric comprises to write, in response to having received the location of each of the plurality of segments of the memory fabric in which to store a portion of the received network packet, the received network packet into the received location of each of the plurality of segments of the memory fabric.

7. The computing device of claim 1, wherein to transmit the network packet received event message to the identified agent comprises to transmit the network packet received event message to an agent fabric interface of the memory fabric associated with the identified agent.

8. The computing device of claim 1, wherein the NIC is further to read and deallocate, by a host fabric interface of the memory fabric and in response to having received a transfer event message from the packet processor or the agent, the entire received network packet from the memory fabric for transfer to a data storage location managed by a compute engine of the computing device.

9. The computing device of claim 1, wherein to send the generated event message by the network fabric interface comprises to:
read, by the network fabric interface, at least a portion of the received network packet from the memory fabric;
identify, by the network fabric interface, the agent for additional processing of the received network packet as a function of the read portion of the received network packet;
generate, by the network fabric interface, the network packet received event message indicating the received network packet is available for processing; and
transmit, by the network fabric interface, the network packet received event message to the identified agent.

10. The computing device of claim 1, wherein the NIC is further to:
write, by a host fabric interface of the memory fabric, a new network packet received by a host interface of the NIC from a compute engine of the computing device to the memory fabric in a distributed fashion;

generate, by the host fabric interface, a new network packet event message indicating the network packet has been received from the compute engine;

send, by the host fabric interface, the new network packet event message to the packet processor via an agent fabric interface of the memory fabric associated with the packet processor;

read, by the packet processor and in response to having received the new network packet event message, at least a portion of the new network packet from the memory fabric;

identify, by the packet processor, an agent of the plurality of agents for additional processing of the new network packet as a function of the read portion of the new network packet;

generate, by the packet processor, a network packet transmit event message indicating the received network packet is available for processing;

transmit, by the packet processor, the network packet transmit event message to the identified agent; and read and deallocate, by the network fabric interface and in response to having received an indication from the identified agent that the network packet is to be transmitted to another computing device, the entire network packet from the memory fabric.

11. The computing device of claim 10, wherein to send the new network packet event message by the host fabric interface comprises to:

read at least a portion of the received network packet from the memory fabric;

identify the agent for additional processing of the received network packet as a function of the read portion of the received network packet;

generate the new network packet event message indicating the new network packet is available for processing; and transmit the new network packet event message to the identified agent.

12. One or more non-transitory, machine-readable storage media comprising a plurality of instructions stored thereon that, in response to being executed, cause a computing device to:

write, by a network fabric interface of a memory fabric of a network interface controller (NIC) of the computing device, a received network packet to the memory fabric in a distributed fashion;

generate, by the network fabric interface, an event message indicating the received network packet has been received;

send, by the network fabric interface, the generated event message to a packet processor communicatively coupled to the memory fabric;

read, by the packet processor and in response to having received the generated event message, at least a portion of the received network packet from the memory fabric;

identify, by the packet processor, an agent of a plurality of agents for additional processing of the received network packet as a function of the read portion of the received network packet;

generate, by the packet processor, a network packet received event message indicating the received network packet is available for processing; and transmit, by the packet processor, the network packet received event message to the identified agent.

13. The one or more non-transitory, machine-readable storage media of claim 12, wherein to identify the agent for additional processing of the received network packet comprises to:

parse the read portion of the received network packet;

classify the network packet as a function of the parsed read portion of the received network packet; and compare a result of the classification against a policy associated with each of the plurality of agents to identify the agent from the plurality of agents.

14. The one or more non-transitory, machine-readable storage media of claim 12, wherein to send the network packet received event message to the packet processor comprises to include a segment pointer usable to identify a location in the memory fabric at which the received network packet has been written to, and wherein to read the portion of the received network packet from the memory fabric comprises to read the portion of the received network packet from the memory fabric based on the segment pointer.

15. The one or more non-transitory, machine-readable storage media of claim 12, wherein the plurality of instructions further cause the computing device to classify, by the network fabric interface, the event message as one of a traffic class event or a service class event, and wherein to identify the agent comprises to identify the agent as a function of the event classification.

16. The one or more non-transitory, machine-readable storage media of claim 12, wherein to write the received network packet to the memory fabric comprises to write the received network packet into a plurality of segments of the memory fabric.

17. The one or more non-transitory, machine-readable storage media of claim 16, wherein the plurality of instructions further cause the computing device to request, by the network fabric interface, a location of each of the plurality of segments of the memory fabric, wherein to write the received network packet into the plurality of segments of the memory fabric comprises to write, in response to having received the location of each of the plurality of segments of the memory fabric in which to store a portion of the received network packet, the received network packet into the received location of each of the plurality of segments of the memory fabric.

18. The one or more non-transitory, machine-readable storage media of claim 12, wherein to transmit the network packet received event message to the identified agent comprises to transmit the network packet received event message to an agent fabric interface of the memory fabric associated with the identified agent.

19. The one or more non-transitory, machine-readable storage media of claim 12, wherein the plurality of instructions further cause the computing device to read and deallocate, by a host fabric interface of the memory fabric and in response to having received a transfer event message from the packet processor or the agent, the entire received network packet from the memory fabric for transfer to a data storage location managed by a compute engine of the computing device.

20. The one or more non-transitory, machine-readable storage media of claim 12, wherein to send the generated event message by the network fabric interface comprises to:

read, by the network fabric interface, at least a portion of the received network packet from the memory fabric;

identify, by the network fabric interface, the agent for additional processing of the received network packet as a function of the read portion of the received network packet;

generate, by the network fabric interface, the network packet received event message indicating the received network packet is available for processing; and transmit, by the network fabric interface, the network packet received event message to the identified agent.

21. The one or more non-transitory, machine-readable storage media of claim 12, wherein the plurality of instructions further cause the computing device to:

write, by a host fabric interface of the memory fabric, a new network packet received by a host interface of the NIC from a compute engine of the computing device to the memory fabric in a distributed fashion;

generate, by the host fabric interface, a new network packet event message indicating the network packet has been received from the compute engine;

send, by the host fabric interface, the new network packet event message to the packet processor via an agent fabric interface of the memory fabric associated with the packet processor;

read, by the packet processor and in response to having received the new network packet event message, at least a portion of the new network packet from the memory fabric;

identify, by the packet processor, an agent of the plurality of agents for additional processing of the new network packet as a function of the read portion of the new network packet;

generate, by the packet processor, a network packet transmit event message indicating the received network packet is available for processing;

transmit, by the packet processor, the network packet transmit event message to the identified agent; and read and deallocate, by the network fabric interface and in response to having received an indication from the identified agent that the network packet is to be transmitted to another computing device, the entire network packet from the memory fabric.

22. The one or more non-transitory, machine-readable storage media of claim 21, wherein to send the new network packet event message by the host fabric interface comprises to:

read at least a portion of the received network packet from the memory fabric;

identify the agent for additional processing of the received network packet as a function of the read portion of the received network packet;

generate the new network packet event message indicating the new network packet is available for processing; and transmit the new network packet event message to the identified agent.

23. A method for processing network packets by a computing device in an agent-mesh architecture, the method comprising:

writing, by a network fabric interface of a memory fabric of a network interface controller (NIC) of the computing device, a received network packet to the memory fabric in a distributed fashion;

generating, by the network fabric interface, an event message indicating the received network packet has been received;

sending, by the network fabric interface, the generated event message to a packet processor communicatively coupled to the memory fabric;

reading, by the packet processor and in response to having received the generated event message, at least a portion of the received network packet from the memory fabric;

identifying, by the packet processor, an agent of a plurality of agents for additional processing of the received network packet as a function of the read portion of the received network packet, wherein each of the plurality of agents is communicatively coupled to the memory fabric via a corresponding agent fabric interface of the memory fabric;

generating, by the packet processor, another event message indicating the received network packet is available for processing; and transmitting, by the packet processor, the other generated event message to the identified agent.

24. The method of claim 23, wherein identifying the agent for additional processing of the received network packet comprises (i) parsing the read portion of the received network packet, (ii) classifying the network packet as a function of the parsed read portion of the received network packet, and (iii) comparing a result of the classification against a policy associated with each of the plurality of agents to identify the agent from the plurality of agents.

25. The method of claim 23, wherein sending the generated event message to the packet processor includes sending the generated event message with a segment pointer usable to identify a location in the memory fabric at which the received network packet has been written to, and wherein reading the portion of the received network packet from the memory fabric comprises reading the portion of the received network packet from the memory fabric based on the segment pointer.

* * * * *